United States Patent
Mizuno et al.

[11] Patent Number: 6,017,100
[45] Date of Patent: Jan. 25, 2000

[54] APPARATUS FOR CONTROLLING VACUUM PRESSURE IN INTERNAL COMBUSTION ENGINE

[75] Inventors: Hiroyuki Mizuno; Yukio Yoshioka, both of Toyota, Japan

[73] Assignee: Toyota Jidosha Kabushiki Kaisha, Toyota, Japan

[21] Appl. No.: 08/985,716

[22] Filed: Dec. 5, 1997

[30] Foreign Application Priority Data

Dec. 10, 1996 [JP] Japan ................................ 8-329831

[51] Int. Cl.⁷ .............................. F02D 41/08; B60J 8/44
[52] U.S. Cl. ......................................... 303/114.3; 123/295
[58] Field of Search ....................... 303/114.3; 477/205, 477/206; 123/295

[56] References Cited

U.S. PATENT DOCUMENTS

| | | |
|---|---|---|
| 2,876,876 | 3/1959 | Cummins . |
| 3,799,303 | 3/1974 | Stoltman . |
| 3,947,073 | 3/1976 | Cattaneo et al. . |
| 4,610,483 | 9/1986 | Matsumoto et al. . |
| 5,091,857 | 2/1992 | Katayama et al. ................ 364/431.09 |
| 5,152,587 | 10/1992 | Volz . |
| 5,758,308 | 5/1998 | Maki et al. ............................ 701/104 |
| 5,826,559 | 10/1998 | Ichimoto et al. . |
| 5,846,164 | 12/1998 | Harada . |
| 5,875,757 | 3/1999 | Mizuno .................................. 123/295 |
| 5,881,693 | 3/1999 | Mizuno .................................. 123/295 |

FOREIGN PATENT DOCUMENTS

| | | |
|---|---|---|
| 1231337 | 9/1960 | France . |
| 8-164840 | 6/1996 | Japan . |
| 308680 | 5/1930 | United Kingdom . |

*Primary Examiner*—Chris Schwartz
*Attorney, Agent, or Firm*—Oliff & Berridge, PLC

[57] ABSTRACT

Pressure in an air intake passage is changed according to an opening size of a throttle valve. The throttle valve is open when an engine performs a stratified charge combustion. The opening size of the throttle valve is selected based on a load applied to the engine when the engine performs a homogeneous charge combustion. A brake booster is connected to the intake passage and accumulates the pressure that is generated in the intake passage. The brake booster obtains braking force for the vehicle when the accumulated pressure is smaller than a predetermined reference value. The throttle valve is actuated by a controller to decrease the pressure in the intake passage when pressure in the brake booster detected by a pressure sensor is larger than the predetermined reference value. The reference value is corrected by the controller based on movement characteristics of the vehicle that is detected by velocity sensor.

13 Claims, 7 Drawing Sheets

APPARATUS FOR CONTROLLING VACUUM PRESSURE IN INTERNAL COMBUSTION ENGINE

BACKGROUND OF THE INVENTION

The present invention relates to apparatuses for controlling negative pressure in internal combustion engines. More particularly, the present invention pertains to apparatuses for controlling vacuum in internal combustion engines having brake boosters, which use vacuum to improve braking force.

In a typical engine, fuel is injected into an intake passage from a fuel injection valve to charge a homogeneous mixture of fuel and air to the associated combustion chamber. The homogeneous air-fuel mixture is ignited by an ignition plug to produce torque. This type of combustion, in which air-fuel mixture is ignited in a combustion chamber, is generally called homogeneous charge combustion. In an engine performing homogeneous charge combustion, a throttle valve located in an intake passage controls the cross-sectional area of the intake passage thereby controlling the amount of air-fuel mixture supplied to a combustion chamber. The power of the engine is controlled, accordingly. However, a high level of vacuum (a low absolute pressure) is produced by the throttling action of the throttle valve. This increases pumping losses and thus reduces the engine efficiency.

To attempt to solve this problem, stratified charge combustion has been proposed. In stratified charge combustion, a relatively rich air-fuel mixture is delivered to the vicinity of an ignition plug for ensuring the ignition of the mixture, and the generated flame burns the surrounding leaner mixture. The power of the engine is basically controlled by changing the amount of fuel injected to the vicinity of the ignition plug. This eliminates the necessity for changing the cross-sectional area of the intake passage to control the engine power, which decreases pumping loss and improves the engine efficiency. Further, stratified charge combustion allows an engine to be operated with a relatively high air-fuel ratio and thus improves the fuel economy of the engine.

Engines that switch between stratified charge combustion and homogeneous charge combustion in accordance with their running state have been proposed. One such engine has a homogeneous charge fuel injection valve and a stratified charge fuel injection valve. The homeogeneous charge injection valve uniformly disperses fuel into the combustion chamber and the stratified charge injection valve injects fuel toward the vicinity of the ignition plug. Switching to stratified charge combustion from homogeneous charge combustion when the engine load is small improves the engine efficiency and the fuel economy.

Some engines are provided with a brake booster that increases the braking force thereby decreasing the force required to depress the brake pedal. The brake booster uses vacuum, which is produced in the intake passage downstream of the throttle valve, as a drive source. That is, vacuum is communicated with the brake booster through a communicating pipe connected to the downstream side of the throttle valve. Vacuum, which corresponds to the degree of depression of the brake pedal, acts on a diaphragm incorporated in the brake booster and increases the force actuating the brake.

In such an engine, pressure in the intake passage is decreased during homogeneous charge combustion. Therefore, the vacuum available for actuating the brake booster is sufficient. However, the pressure in the intake passage is increased during stratified charge combustion. Therefore, there is less vacuum available for braking.

Japanese Unexamined Patent Publication No. 8-164840 discloses an apparatus for controlling vacuum pressure in internal combustion engines for solving this problem. In this apparatus, the throttle valve is closed when the pressure in the brake booster is greater than a predetermined reference level for temporarily decreasing the intake passage pressure, or for temporarily increasing the intake vacuum. Accordingly, sufficient vacuum for actuating the brake booster is communicated with the booster.

In the apparatus, the predetermined reference pressure level is set extremely low for guaranteeing sufficient braking force at any running state of the vehicle, that is, for generating the maximum braking force. However, the maximum braking force is only needed, for example, when a vehicle is moving at a high speed and needs to be rapidly stopped. Therefore, in the apparatus of the above publication, the throttle valve is frequently closed even if there is no need to increase the vacuum in the brake booster. The unnecessary closing action of the throttle valve temporarily decreases the amount of intake air. This reduces the fuel economy and fluctuates the engine torque thus deteriorating the engine performance.

SUMMARY OF THE INVENTION

Accordingly, in an engine having a brake booster that uses vacuum pressure to guarantee braking force, it is an objective of the present invention to provide an apparatus for controlling the vacuum pressure that improves the engine performance and communicates sufficient vacuum pressure in the brake booster for guaranteeing a desirable magnitude of braking booster force.

To achieve the foregoing and other objectives and in accordance with the purpose of the present invention an apparatus for controlling pressure in a vehicle engine is provided. The apparatus has an air intake passage for introducing airflow to a combustion chamber and a throttle valve disposed in the intake passage. The throttle valve is arranged to selectively increase and decrease its opening size to adjust the airflow in the intake passage. Accordingly, pressure in the intake passage is respectively increased and decreased. The throttle valve is open when the engine performs a stratified charge combustion, and the opening size of said throttle valve is selected based on a load applied to the engine when the engine performs a homogeneous charge combustion. The apparatus includes a brake booster, first detecting means, actuating means, second detecting means and correcting means. The brake booster is connected to the intake passage to accumulate the pressure that is generated in the intake passage. The brake booster obtains braking force for the vehicle when the accumulated pressure is smaller than a predetermined reference value. The first detecting means detects the pressure accumulated in the brake booster. The actuating means actuates the throttle valve to decrease the pressure in the intake passage when the detected pressure is larger than the predetermined reference value. The second detecting means detects movement characteristics of the vehicle. The correcting means corrects the reference value based on the detected movement characteristics of the vehicle.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

Figure 1:
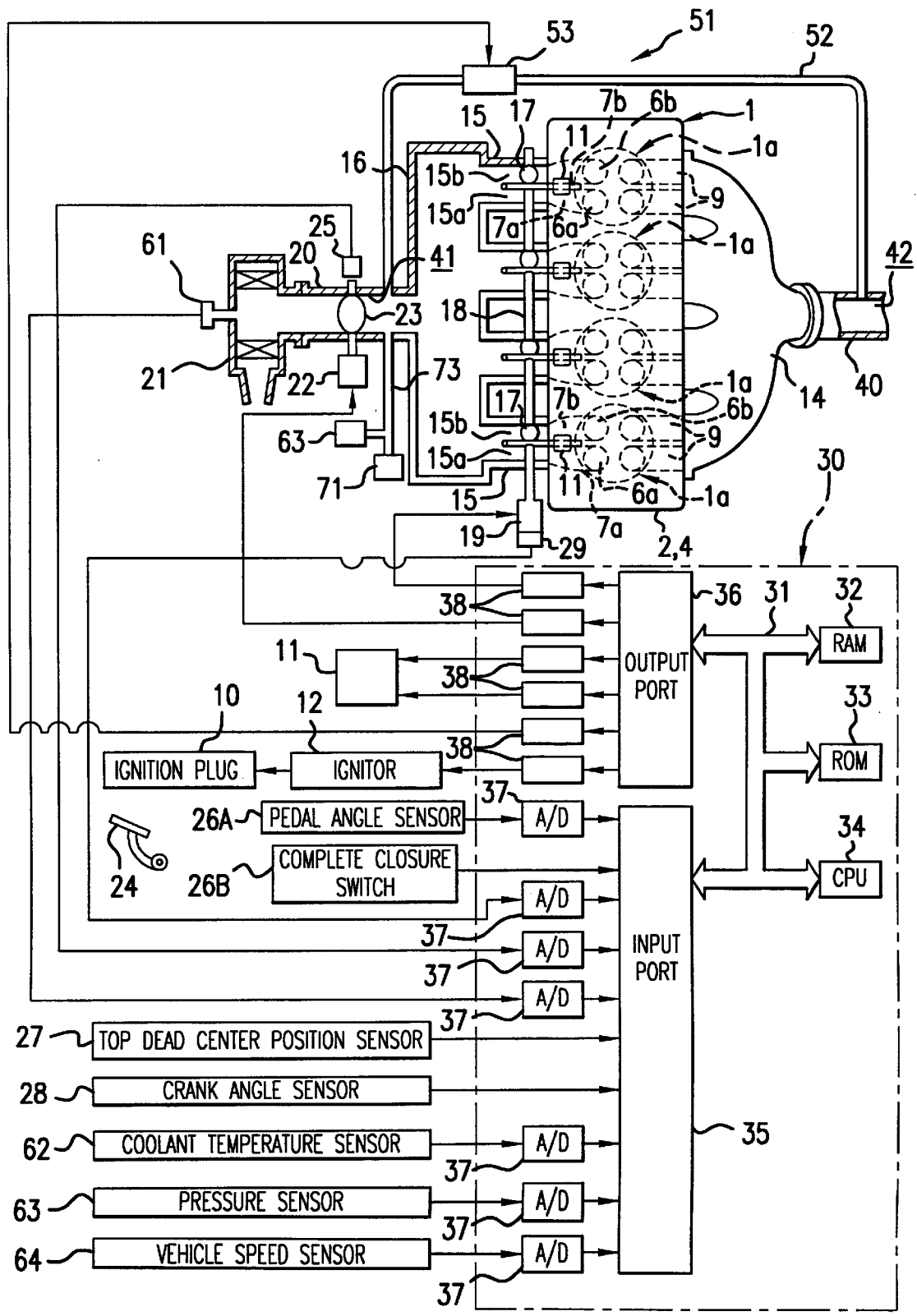
FIG. 1 is a diagram showing an apparatus for controlling vacuum pressure in an engine according to a first embodiment of the present invention.
Figure 2:
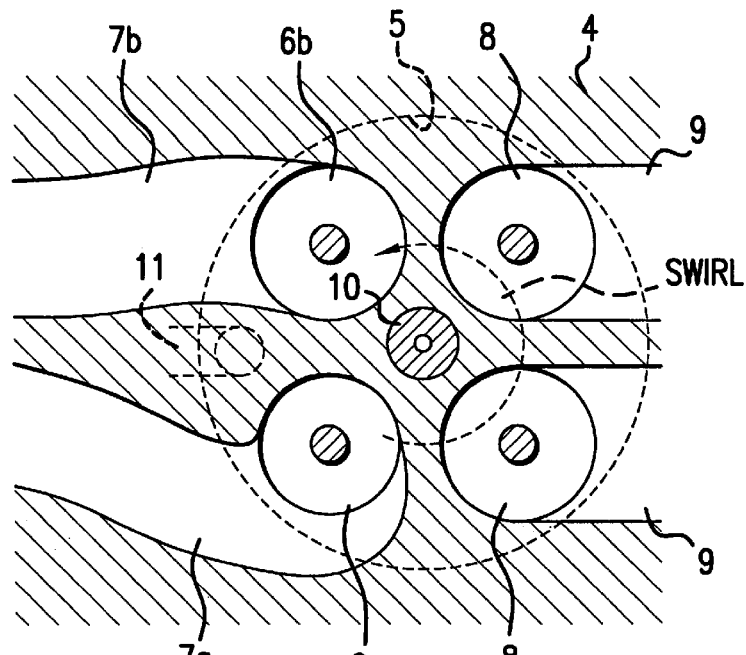
FIG. 2 is an enlarged diagrammatic cross-sectional view showing an engine cylinder.

FIG. 1 is a diagram showing an apparatus for controlling vacuum pressure in a cylinder injection type engine employed in a vehicle according to a first embodiment. As shown in FIG. 1, an engine 1 is provided with four cylinders 1a. The structure of the combustion chamber of each cylinder 1a is shown in FIG. 2. As shown in these drawings, the engine 1 has a cylinder block 2 that accommodates pistons. The pistons are reciprocated in the cylinder block 2. A cylinder head 4 is arranged on top of the cylinder block 2. A combustion chamber 5 is defined between each piston and the cylinder head 4.

A first intake port 7a and a second intake port 7b open to each combustion chamber 5. The ports 7a, 7b are opened and closed by first intake valve 6a and a second intake valve 6b located in the cylinder head 4, respectively. As shown in FIG. 2, the first intake port 7a is a curved port that extends in a helical manner. The second port 7b extends in a generally straight manner. The helical first intake port 7a generates a swirl of intake air. The magnitude of the swirl is controlled by a swirl control valve 17, which will be discussed below.

Ignition plugs 10 are arranged at the middle of the cylinder head 4 to face the combustion chambers 5. High voltage is applied to each ignition plug 10 by an ignitor 12 through a distributor (not shown). Each plug 10 ignites air-fuel mixture in the associated combustion chamber 5.

A fuel injection valve 11 is arranged near the inner wall of the cylinder head 4 in the vicinity of each set of first and second intake valves 6a, 6b in each combustion chamber 5. The fuel injection valve 11 injects fuel directly into the associated combustion chamber 5 of cylinder 1a. The injected fuel is subjected to stratified charge combustion or homogeneous charge combustion.

As shown in FIG. 1, the first and second intake ports 7a, 7b of each cylinder 1a are connected to a surge tank 16 by a first intake passage 15a and a second intake passage 15b, respectively, which are defined in an intake manifold 15. One swirl control valve 17 is located in each second intake passage 15b. The swirl control valves 17 are connected to a step motor 19 by a common shaft 18. The step motor 19 is controlled by signals sent from an electronic control unit (ECU) 30, which will be discussed later, and adjusts the opening of the swirl control valves 17.

The surge tank 16 is connected to an air cleaner 21 through an intake duct 20. A throttle valve 23, which is opened and closed by a step motor 22, is located in the intake duct 20. The throttle valve 23 is electronically controlled. That is, the step motor 22 is actuated by signals from the ECU 30 and adjusts the opening of the throttle valve 23. The opening amount of the throttle valve 23 determines the amount of intake air drawn into the combustion chambers 5 through the intake duct 20 as well as the magnitude of the vacuum produced in the intake duct 20 downstream of the throttle valve 23.

A throttle sensor 25 is located in the vicinity of the throttle valve 23 to detect the opening angle of the valve 23. The intake duct 20, the surge tank 16 and the first and second intake passages 15a, 15b constitute an intake path 41. The exhaust ports 9 of each cylinder 1a are connected to an exhaust manifold 14. After combustion, the exhaust gas is discharged to the outside through the exhaust manifold 14 and the exhaust duct 40.

The engine 1 is provided with a conventional exhaust gas recirculation (EGR) mechanism 51 that includes an EGR passage 52 and an EGR valve 53 located in the EGR passage 52. The EGR passage 52 communicates a port of the intake duct 20 at the downstream side of the throttle valve 23 with an exhaust duct 40. The EGR valve 53 includes a valve seat, a valve body, and a step motor (none of which is shown). The step motor causes the valve body to approach or to separate from the valve seat thereby changing the opening amount of the valve 53.

When the EGR valve 53 opens, some of the exhaust gas sent into the exhaust duct 40 enters the EGR passage 52. The gas is then drawn into the intake duct 20 via the EGR passage 52. In other words, some of the exhaust gas is recirculated by the EGR mechanism 51 and returned to the air-fuel mixture. The amount of recirculated gas (hereinafter referred to as the EGR amount) is controlled in accordance with the opening amount of the EGR valve 53. Accordingly, the EGR gas, or incombustible inert gas, is mixed with intake air drawn into the combustion chambers 5. This lowers the maximum temperature of combustion in the combustion chambers thereby reducing the emission of NOx.

Figure 3:
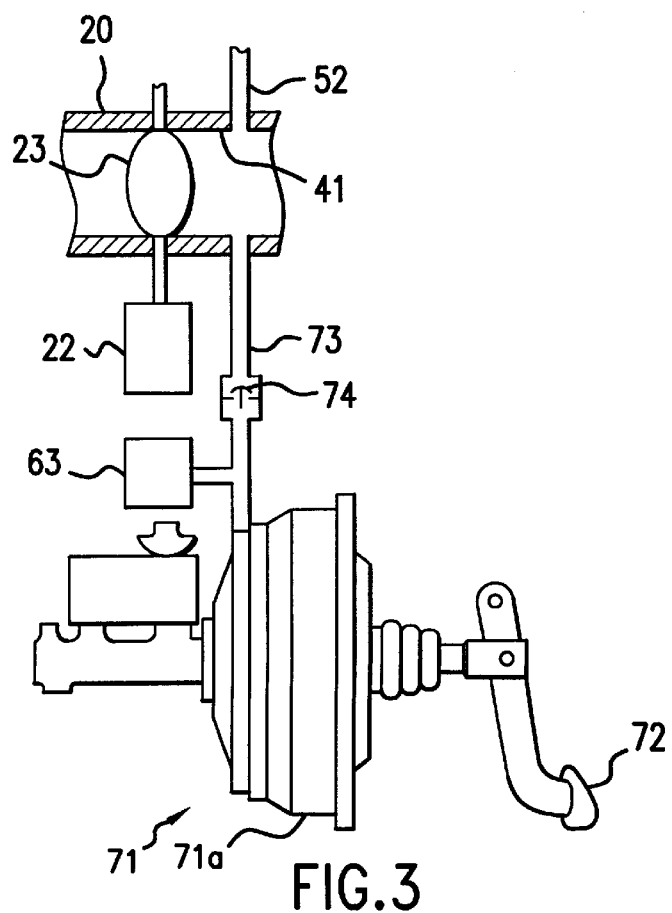
FIG. 3 is a schematic drawing, partly cross sectional, showing the brake booster.

As shown in FIGS. 1 and 3, a brake booster 71 is provided to enhance the braking force of the vehicle. The brake booster 71 increases the pressing force of the brake pedal 72. The pressing force is converted to hydraulic pressure and used to actuate brake actuators (not shown) provided for each wheel. The brake booster 71 is connected to the downstream side of the throttle valve 23 in the intake duct 20 by a connecting pipe 73 and is actuated by the vacuum produced in the duct 20. In other words, the vacuum causes atmospheric pressure to actuate the booster 71.

The brake booster 71 includes a diaphragm (not shown) located in a housing 71a. The diaphragm defines an atmospheric pressure chamber and a vacuum chamber in the housing 71a. The atmospheric pressure chamber is communicated with the atmosphere whereas the vacuum chamber is communicated with the vacuum produced in the intake duct 20 through the connecting pipe 73. Therefore, atmospheric pressure acts on the side of the diaphragm facing the atmospheric pressure chamber and vacuum pressure acts on the other side of the diaphragm, which faces the vacuum chamber.

A check valve 74 is located in the connecting pipe 73. The valve 74 is opened when the pressure in the intake duct 20 is lower than the pressure in the vacuum chamber. Accordingly, the vacuum of the intake duct 20 is communicated with the vacuum chamber. Contrarily, when the pressure in the vacuum chamber is lower than the pressure in the intake duct 20, the check valve 74 is closed. Therefore, the pressure in the vacuum chamber is maintained relatively low. The force of the brake actuators generated by the brake booster 71, or the braking force of the vehicle, is determined by the force acting on the brake pedal 72 and the difference between the atmospheric pressure and the vacuum pressure of the vacuum chamber. A pressure sensor 63 is located in the connecting pipe 73 to detect the pressure PBK (absolute pressure) in the vacuum chamber of the brake booster 71.

The ECU 30 is provided with a random access memory (RAM) 32, a read only memory (ROM) 33, a central processing unit (CPU) 34, an input port 35 and an output port 36. The RAM 32, the ROM 33, the CPU 34, the input port 35, and the output port 36 are connected to one another by a bidirectional bus 31.

An acceleration pedal 24 is connected to a pedal angle sensor 26A. The pedal angle sensor 26A generates voltage proportional to the degree of depression of the acceleration pedal 24. This enables the acceleration pedal depression amount ACCP to be detected. The voltage output by the pedal angle sensor 26A is input to the CPU 30 by way of an analog-to-digital (A/D) converter 37 and the input port 35. The acceleration pedal 24 is also provided with a complete closure switch 26B, which detects whether the acceleration pedal 24 is not pressed at all. The closure switch 26B outputs a complete closure signal IDL of one when the acceleration pedal 24 is not pressed at all and outputs the complete closure signal IDL of zero when the acceleration pedal 24 is pressed. The output voltage of the closure switch 26B is input to the CPU 34 via the input port 35.

The engine 1 is further provided with a top dead center position sensor 27 and a crank angle sensor 28. The top dead center position sensor 27 generates an output pulse when the piston in one of the cylinders 1a reaches the top dead center position. The output pulse is input to the CPU 34 via the input port 35. The crank angle sensor 28 generates an output pulse each time a crankshaft (not shown) of the engine 1 is rotated by a predetermined crank angle. The output pulse sent from the crank angle sensor 28 is input to the CPU 34 via the input port 35. The CPU 34 reads the output pulses of the top dead center position sensor 27 and the crank angle sensor 28 to compute the engine speed NE.

A swirl control valve sensor 29 is located in the vicinity of the step motor 19. The sensor 29 detects the rotational angle of the shaft 18 thereby measuring the opening area of the swirl control valves 17. The signal output of the swirl control valve sensor 29 is input in the CPU 34 via an A/D converter 37 and the input port 35. Likewise, the signal output of the throttle sensor 25 is input to the CPU 34 via an A/D converter 37 and the input port 35.

An atmospheric pressure sensor 61 is located in the intake path 41 for detecting the atmospheric pressure PA. A coolant temperature sensor 62 is located in the cylinder block 2 to detect the temperature of the engine coolant. A vehicle speed sensor 64 is provided in the vicinity of a wheel to detect the speed of the vehicle (vehicle speed SPD). The signal output of the sensors 61, 62, 64 is input to the CPU 34 via an A/D converter 37 and the input port 35. Also, the signal output of the pressure sensor 63 is input to the CPU 34 via the A/C converter 37 and the input port 35.

The output port 36 is connected to the fuel injection valves 11, the step motors 19, 22, the ignitor 12, and the EGR valve 53 (step motor) by way of drive circuits 38. The ECU 30 optimally controls the fuel injection valves 11, the step motors 19, 22, the ignitor 12 (ignition plugs 10), and the EGR valve 53 with control programs stored in the ROM 33 based on signals sent from the sensors 25–29, 61–64.

Figure 4:
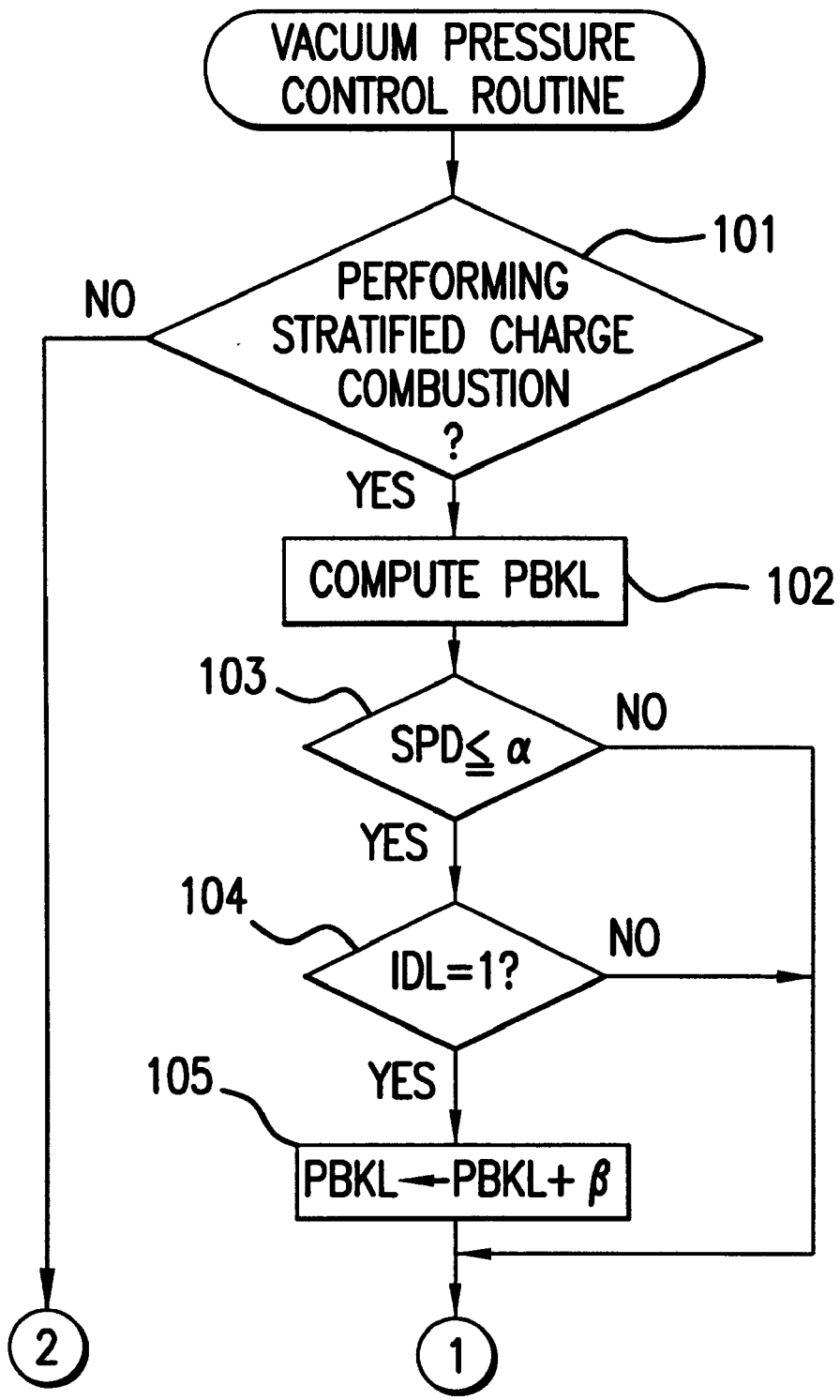
FIG. 4 is a flowchart illustrating a vacuum pressure control routine according to the first embodiment.
Figure 5:
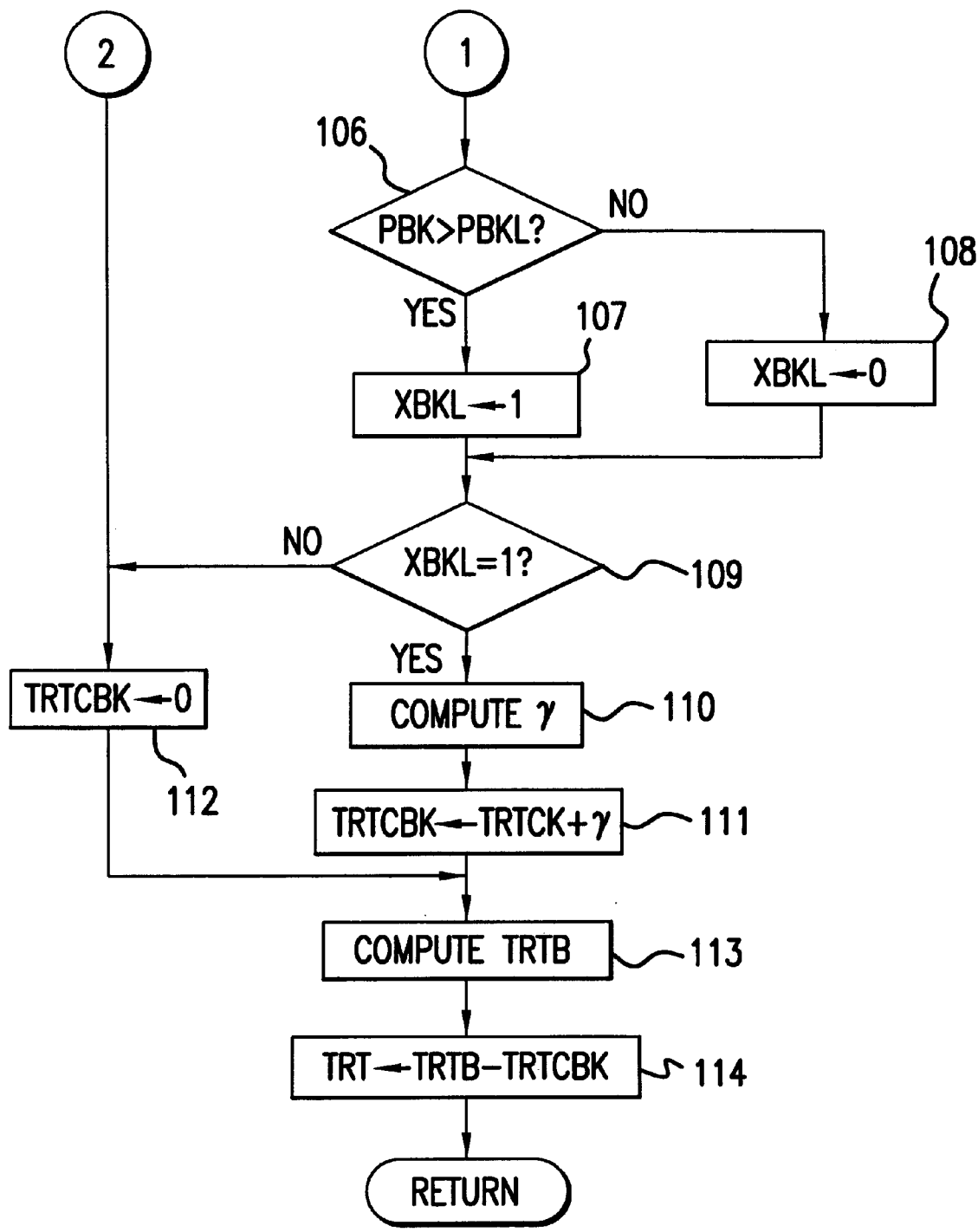
FIG. 5 is a flowchart illustrating a continuation of the vacuum pressure control routine of FIG. 4.

Vacuum control performed by the above described apparatus will now be described. FIGS. 4 and 5 are flowcharts showing a routine of the vacuum control. In this routine, the throttle valve 23 (the step motor 22) is controlled to change the pressure of the vacuum chamber in the brake booster 71. This routine is an interrupt executed by the ECU 30, for example, at every predetermined crank angle.

At step 101, the ECU 30 judges whether the engine 1 is performing stratified charge combustion. If the determination is negative, homogeneous charge combustion is performed. In this case, vacuum for actuating the brake booster 71 is sufficient. The ECU 30 therefore judges that the vacuum chamber pressure PBK does not need to be lowered and moves to step 112 in the flowchart of FIG. 5.

At step 112, the ECU 30 sets a closing amount TRTCBK of the throttle valve 23 at zero. The throttle closing amount TRTCBK represents an amount by which the throttle valve 23 is closed when the throttle valve 23 is closed to produce vacuum for the brake booster 71.

At step 113, the ECU 30 computes a basic throttle opening amount TRTB based on detection signals, such as the acceleration pedal depression amount ACCP and the engine speed NE. When computing TRTB, the CPU 30 refers to function data (not shown) stored in the ROM 33.

In the subsequent step 114, the ECU 30 subtracts the current throttle closing amount TRTCBK from the basic throttle opening amount TRTB. The ECU 30 substitutes the resultant for the final target throttle opening amount TRT and temporarily suspends the routine. After steps 112, 113 are executed, the throttle closing amount TRTCBK is zero. The target throttle opening amount TRT thus equals the basic throttle opening TRTB when homogeneous charge combustion is being performed.

If the engine 1 is judged to be performing stratified charge combustion at step 101, the ECU 30 judges that the vacuum chamber pressure PBK needs to be lowered and moves to step 102.

At step 102, the ECU 30 computes a starting pressure value PBKL by referring to function data stored in the ROM 33. The pressure value PBKL is a function of the vehicle speed SPD and indicates whether vacuum needs to be produced in the vacuum chamber of the brake booster 71, that is, whether the opening of the throttle valve 23 needs to be decreased. This process is referred to as the vacuum producing process.

Figure 6:
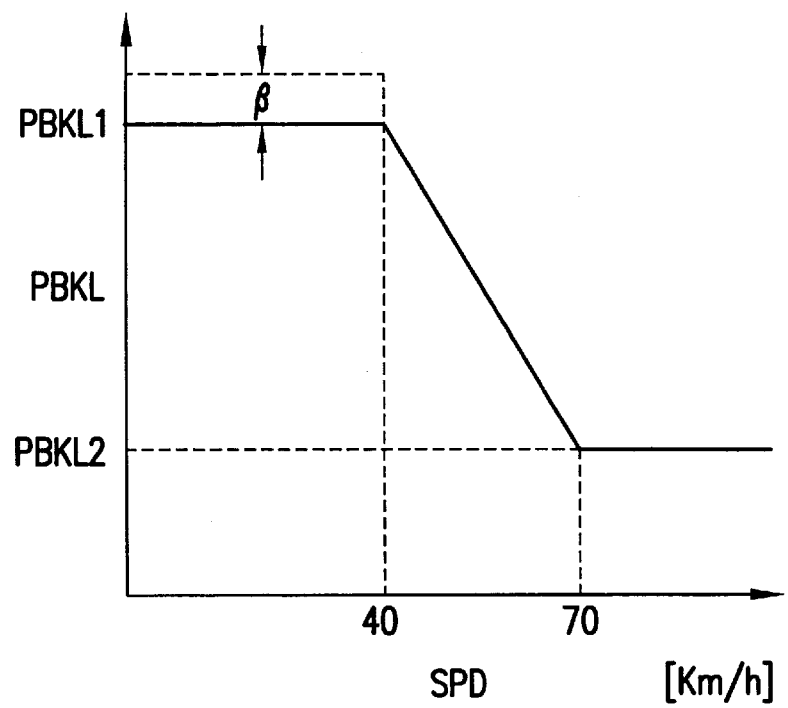
FIG. 6 is a graph showing the relationship between vehicle speed and the pressure of the brake booster at which a vacuum pressure producing process is started.

FIG. 6 is a graph showing the relationship between the vehicle speed SPD and the starting pressure PBKL. The starting pressure value PBKL has a higher value for a lower vehicle speed SPD. Specifically, the pressure value PBKL is set at PBKL1 when the vehicle speed SPD is 40 km/h or lower and is set at PBKL2 (<PBKL1) when the vehicle speed SPD is 70 km/h or higher. The pressure values PBKL1 and PBKL2 are determined based on the performance characteristics of the brake booster 71, which depend primarily on the diameter of the diaphragm, and the required braking force of the vehicle.

After computing the starting pressure value PBKL, the ECU 30 moves to step 103. At step 103, the ECU 30 judges whether the vehicle speed SPD is equal to or lower than a determination value α. The determination value α is used for judging whether the vehicle is moving at a relatively low speed and thus only weak braking force is required for stopping the vehicle. In this embodiment, the value α is set at 40 km/h. If the determination is positive at step 103, the ECU 30 moves to step 104.

At step 104, the ECU 30 judges whether the complete closure signal IDL is one. If the determination is positive, the vehicle is decelerating or moving at a constant speed but is not accelerating. In this case ECU 30 moves to step 105 for increasing the starting pressure value PBKL.

Specifically, the ECU 30 adds a predetermined value β to the current starting pressure value PBKL at step 105. The ECU 30 substitutes the resultant for the starting pressure value PBKL.

After executing step 105, or when the determination is negative either at steps 103 or 104, the ECU 30 moves to step 106 shown in FIG. 5. At step 106, the ECU 30 judges whether the pressure PBK in the vacuum chamber of the brake booster 71 is greater than the starting pressure value PBKL. If the determination is positive, vacuum in the brake booster 71 is not sufficient (the pressure in the vacuum chamber is too high). In this case, the ECU 30 moves to step 107 and sets a request flag XBKL at one. The request flag XBKL indicates whether a process for producing vacuum is required. Specifically, the flag XBKL indicates whether the opening of the throttle valve 23 needs to be decreased for producing vacuum in the brake booster 71.

If the determination is negative at step 106, vacuum in the brake booster 71 is sufficient. In this case, the ECU 30 moves to step 108. At step 108, the ECU 30 sets the request flag XBKL at zero.

After executing steps 107 or 108, the ECU 30 moves to step 109 and judges whether the request flag XBKL is set at one. If the determination is negative, the ECU 30 executes steps 112, 113 and 114 as when the determination is positive at step 101, that is, when homogeneous charge combustion is performed.

If the determination is positive at step 109, on the other hand, the ECU 30 executes steps 110–114 to decrease the opening of the throttle valve 23 thereby producing sufficient vacuum in the brake booster 71.

At stop 110, the ECU 30 computes a closing compensation amount γ referring to function data stored in the ROM 33. The compensation amount γ is indicated in correspondence with a pressure difference (PBK−PBKL), or a value that is computed by subtracting the starting pressure value PBKL from the vacuum chamber pressure PBK.

Figure 7:
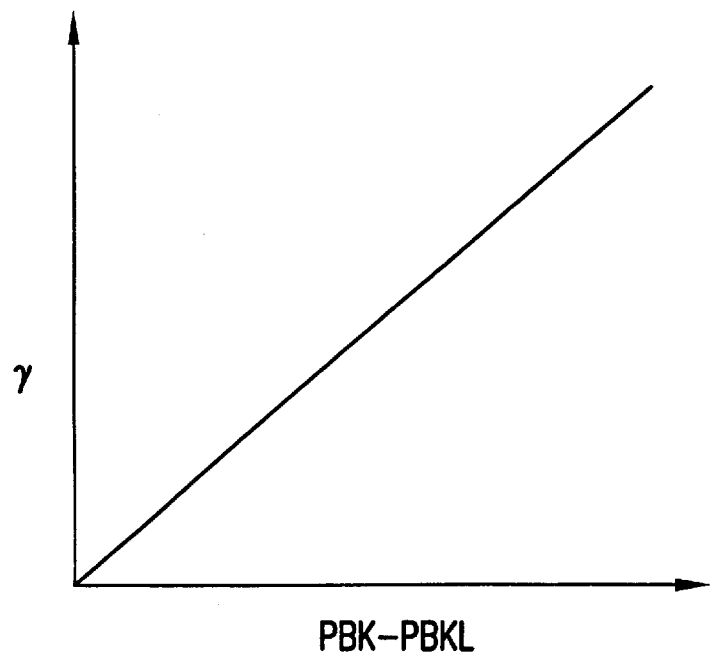
FIG. 7 is graph showing the relationship between a closing compensation amount of a throttle valve and the difference between the pressure in a brake booster and the pressure value at which a vacuum pressure producing process is started.

FIG. 7 is a graph showing the relationship between the compensation amount γ and the pressure difference (PBK−PBKL). As shown in the graph, the compensation amount γ has a larger value for a larger value of the pressure difference (PBK−PBKL). Thus, the greater the value of the pressure difference (PBK−PBKL) is, the greater the closing speed of the throttle valve 23 is. Accordingly, the rate of increase in intake vacuum is increased for greater pressure differences. Contrarily, when the vacuum chamber pressure PBK of the brake booster 71 approaches the starting pressure value PBKL, that is, when the pressure difference (PBK−PBKL) is decreased, the compensation amount γ is set at a smaller value. This reduces the closing speed of the throttle valve 23.

At the subsequent step 111, the ECU 30 adds the closing compensation amount γ to the current throttle closing amount TRTCBK. The ECU 30 substitutes the resultant for the throttle closing amount TRTCBK. Thereafter, the ECU 30 executes the steps 113 and 114 for computing the target throttle opening TRT.

The ECU sends signals based on the computed final target throttle opening amount TRT to the step motor 22 thereby controlling the opening amount of the throttle valve 23. Therefore, when the vacuum chamber pressure PBK is greater than the starting pressure value PBKL, the opening amount of the throttle valve 23 is decreased. Thus, the intake vacuum is increased. The increased vacuum is communicated with the vacuum chamber of the brake booster 71 by the connecting pipe 73. As a result, the vacuum chamber pressure PBX is decreased and maintained equal to or lower than the star ting pressure value PBKL.

In this manner, whether vacuum for actuating the brake booster 71 needs to be produced is judged. If the determination is positive, the vacuum producing process is performed for producing vacuum for actuating the brake booster 71.

In this embodiment, the vacuum chamber pressure PBK is compared with the starting pressure PBKL for determining whether vacuum for actuating the brake booster 71 needs to be produced. When the vehicle speed SPD is high, a greater braking force is needed for stopping the vehicle. Therefore, the vacuum chamber pressure PBK needs to be lower. Contrarily, when the vehicle speed SPD is low, the required braking force is small. Therefore, it is not necessary to maintain such a low pressure PBK in the vacuum chamber. In this manner, the required braking force of the vehicle changes in accordance with the vehicle speed SPD.

In consideration of such behavior of the required braking force, the starting pressure PBKL is set at a higher value for a lower vehicle speed SPD. Thus, the vacuum chamber pressure PBK is controlled to a sufficient level for obtaining a desired braking force. Therefore, unnecessary vacuum producing processes are not executed. The amount of intake air thus does not frequently fluctuate. This reduces torque fluctuations and improves the fuel economy.

When the vehicle is not accelerating, that is, when the vehicle is decelerating or moving at a constant speed, the required braking force is less than that required at the same momentary speed when the vehicle is accelerating. In this embodiment, the vehicle is judged to be moving at a low speed and not accelerating when the vehicle speed SPD is 40 km/h or lower and the acceleration pedal is not depressed at all. In this case, the starting pressure value PBKL is further increased. Therefore, unnecessary vacuum producing processes are not executed. This further improves the driving characteristics of the vehicle such as torque stability and fuel econommny.

Further, the electronically controlled throttle mechanism, which includes the throttle valve 23 and the step motor 22, is used for increasing vacuum in the intake passage 41. Thus, existing apparatus can be used for producing vacuum. This reduces the manufacturing cost of the apparatus.

When increasing the throttle closing amount TRTCBK, the closing compensation amount γ, which is computed in the current routine, is added to the throttle closing amount TRTCBK used in the previous routine. The compensation amount γ has a greater value when the difference between the vacuum chamber pressure PBK and the starting pressure value PBKL (PBK–PBKL) is greater. As a result, the closing speed of the throttle valve 23 is increased. Accordingly, the vacuum chamber pressure PBK is quickly decreased.

On the other hand, when the vacuum chamber pressure PBK approaches the starting pressure value PBKL and the pressure difference (PBK—PBKL) is decreased, the compensation amount γ is set to a smaller value. Therefore, undershoot in the throttle closing process is reduced and the vacuum chamber pressure PBK is positively converged with the starting pressure value PBKL. As a result, when there is sufficient vacuum, decreased intake air amount is quickly brought back to the normal level. In other words, the intake air amount is increased when sufficient vacuum is produced. This further improves the engine performance such as torque stability and fuel economy.

A second embodiment of the present invention will now be described with reference to FIG. 8. This routine is used to control the same apparatus of FIGS. 1–3 as the first embodiment.

In the first embodiment, the throttle valve 23 is closed for producing vacuum when stratified charge combustion is performed. In the second embodiment, however, the combustion state of the engine 1 is switched from stratified charge combustion to homogeneous charge combustion for producing vacuum.

Figure 8:
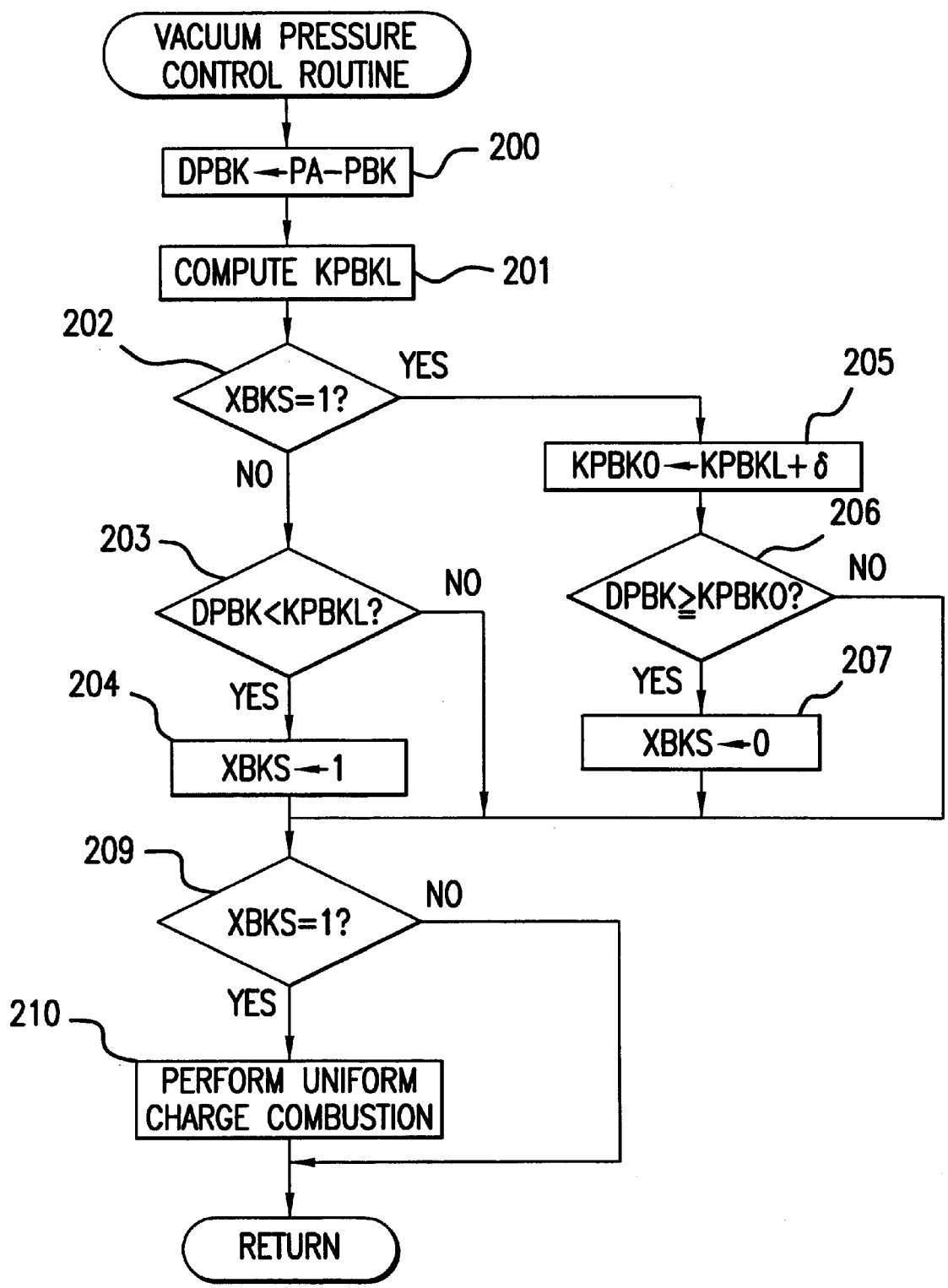
FIG. 8 is a flowchart illustrating a vacuum pressure control routine according to a second embodiment.

FIG. 8 is a flowchart showing a routine of the vacuum control. This routine is an interrupt executed by the ECU 30, for example, at every predetermined crank angle.

At step 200, the ECU 30 subtracts the vacuum chamber pressure PBX from the atmospheric pressure PA. The ECU 30 substitutes the resultant for a relative pressure value DPBK. Unlike the pressure PBK in the vacuum chamber of the brake booster 71, the value of the relative pressure DPBK decreases as the vacuum in the vacuum chamber of the booster 71 decreases, that is, it decreases as the absolute pressure in the booster 71 increases.

Figure 9:
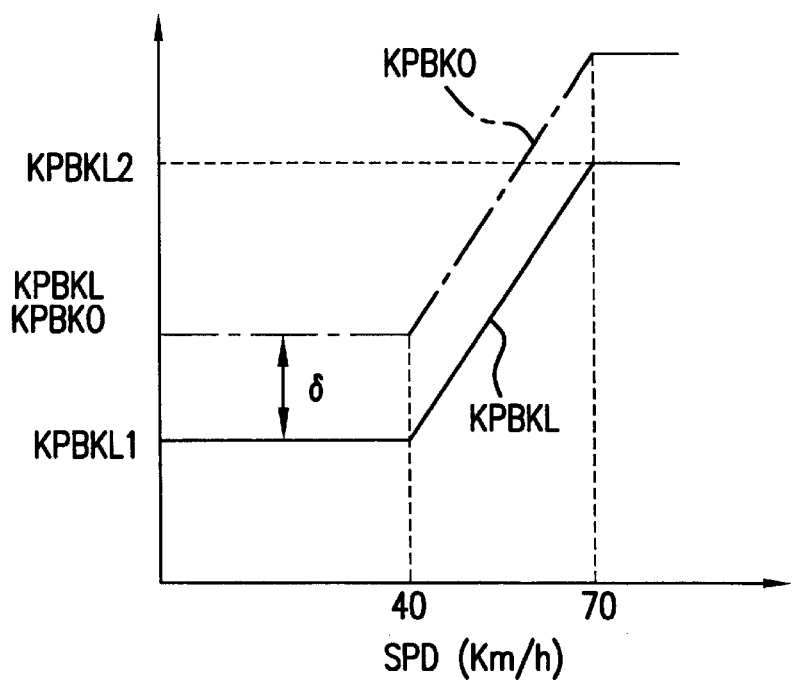
FIG. 9 is a graph showing the relationship between vehicle speed and relative pressures of the brake booster at which the vacuum pressure producing process is started and finished.

At step 201, the ECU 30 computes a relative pressure value KPBKL at which the vacuum producing process is started by referring to function data stored in the ROM 33. The computed relative pressure value KPBKL corresponds to the current vehicle speed SPD. FIG. 9 is a graph of the function data used at step 201. Unlike the first embodiment, the starting relative pressure value KPBKL has a lower value for a lower vehicle speed SPD because, unlike FIG. 6, the pressure scale (the vertical axis) of FIG. 9 indicates relative pressure between the atmosphere and the vacuum chamber of the brake booster 71. For example, when the vehicle speed is 40 Km/h or lower, the relative pressure value KPBKL is KPBKL1. When the vehicle speed is 70 km/h or higher, the relative pressure value KPBKL is KPBKL2, which is higher than KPBKL1. The relative pressure values KPBKL1 and KPBKL2 are determined based on the performance characteristics of the brake booster 71, which depends primarily on the diameter of the diaphragm, and the required braking force of the vehicle.

In this embodiment, higher values on the vertical axis of FIG. 9 indicate that more vacuum is available in the vacuum chamber of the brake booster 71. In other words, higher values on the vertical axis of FIG. 9 indicate a lower absolute pressure in the vacuum chamber of the brake booster 71.

At step 202, the ECU 30 judges whether a request flag XBKS is set at one. The request flag XBKS indicates whether a process for producing vacuum is required. If the determination is negative, the vacuum producing process was not executed in the previous routine. In this case the ECU 30 moves to step 203.

At step 203, the ECU 30 judges whether the relative pressure value DPBK is smaller than the starting relative pressure value KPBKL. If the determination is positive, the vacuum chamber pressure PBK has increased and vacuum for actuating the brake booster 71 needs to be produced. In this case, the ECU 30 moves to step 204. At step 204, the ECU 30 sets the request flag XBKS at one, which indicates whether the vacuum producing process is required. The ECU 30 then moves to step 209.

If the determination is negative at step 203, there is sufficient vacuum for actuating the brake booster 71. The ECU 203 thus does not change the value of the request flag XBKS and moves to step 209.

If the determination is positive at step 202, the vacuum producing process is currently being executed. In this case, the ECU 30 moves to step 205. At step 205, the ECU 30 adds a predetermined value δ to the starting relative pressure value KPBKL and substitutes the resultant for a finishing relative pressure value KPBKO, at which the vacuum producing process for actuating the brake booster 71 is terminated. Since an equation (KBKO=KPBKL+δ) is satisfied, the relationship between the finishing relative pressure value KPBKO and the vehicle speed SPD is represented by the dashed Line in FIG. 9. Similar to the starting relative pressure value KPBKL, the finishing relative pressure value KPBKO has a higher value for a higher vehicle speed SPD.

At the subsequent step 206, the ECU 30 judges whether the relative pressure value DPBK is equal to the finishing relative pressure value KBPKO or higher. It the determination is positive, there is sufficient vacuum for actuating the brake booster 71. In this case, the ECU 30 moves to step 207. At step 207, the ECU 30 sets the request flag XBKS, which indicates whether the process for producing vacuum is required, at zero and moves to step 209. If the determination is negative at step 206, on the other hand, the vacuum producing process needs to be continued. In this case, the ECU 30 does not change the value of the request flag XBKS and moves to step 209.

At step 209, the ECU 30 judges whether the request flag XBKS is set at one. If the determination is positive, the vacuum producing process needs to be performed. In this case, the ECU 30 moves to step 210. At step 210, the ECU 30 switches the combustion state of the engine 1 to homogeneous charge combustion and then temporarily suspends the current routine.

If the determination is negative at step 209, there is sufficient vacuum for actuating the brake booster 71. In this case, the ECU 30 does not change the current combustion state and temporarily suspends the current routine.

The ECU 30 performs the selected combustion state of the engine 1 by optimally controlling the fuel injection valves 11, the step motors 19, 22, the ignitor 12 (the ignition plugs 10) and the EGR valve 53 based on other control programs.

Thus, the combustion state of the engine 1 is switched to homogeneous charge combustion when the relative pressure value DPBK is lower than the starting relative pressure value KPBKL, that is, when the vacuum chamber pressure PBK is greater than a desired pressure, which is lower than atmospheric pressure by a predetermined amount. As described above, the opening of the throttle valve 23 is significantly decreased when homogeneous charge combustion is performed compared to when stratified charge combustion is performed. Performing homogeneous charge combustion therefore increases vacuum in the intake path 41, or decreases the absolute pressure in the path 41, to a sufficient level for actuating the brake booster 71. The produced vacuum is communicated with the vacuum chamber of the brake booster 71 by the connecting pipe 73. The relative pressure value DPBK is then quickly increased. When the relative pressure value DPBK equals the finishing pressure value KPBKO, the vacuum producing process, in which the combustion state of the engine 1 is switched to homogeneous charge combustion, is terminated.

In this manner, when vacuum pressure needs to be produced for actuating the brake booster 71, homogeneous charge combustion is performed. Accordingly, intake vacuum is sufficiently and quickly increased. This ensures positive actuation of the brake booster 71.

In this embodiment, the starting pressure value KPBKL and the finishing pressure value KPBKO are set lower for a lower vehicle speed SPD. Since the required braking force is small when the vehicle speed SPD is low, a smaller relative pressure DPBK is tolerable (or a higher vacuum chamber pressure PBK is tolerable). Therefore, when the vehicle is moving at a low speed, the combustion state of the engine 1 is not frequently switched to homogeneous charge combustion, which improves fuel economy.

The vacuum producing process is started when the relative pressure value DPBK is smaller than the starting pressure value KPBKL. The process is continued after the relative pressure value DPBK exceeds the starting pressure value KPBKL. The process is terminated when the relative pressure DPBK equals the finishing pressure value KPBKO, which is higher than the pressure value KPBKL. That is, target values (the pressure values KPBKL and KPBKO) have a hysterisis. This prevents hunting, or prevents the vacuum producing process from repeatedly starting and stopping, thereby stabilizing the control process.

The difference between the atmospheric pressure PA and the vacuum chamber pressure PBK is computed and represented by the relative pressure DPBK. When the relative pressure DPBK is smaller than the starting relative pressure value KPBKL, the vacuum producing process is started. The braking force of the brake booster 71 changes according to the difference between the atmospheric pressure of the atmospheric pressure chamber and the vacuum (the vacuum chamber pressure PBK) communicated with the vacuum chamber by the connecting pipe 73. Therefore, when traveling at a high altitude, the atmospheric pressure PA is relatively low. Thus, even if the vacuum chamber pressure PBX is constant, the braking force of the booster 71 is decreased.

However, vacuum is produced when the relative pressure DPBK, and not the vacuum chamber pressure PBK, is smaller than the starting relative pressure KPBKL. Therefore, when the braking force is decreased below a certain level by a low atmospheric pressure PA, the vacuum producing process is started for producing sufficient vacuum for actuating the brake booster 71.

It should be apparent to those skilled in the art that the present invention may be embodied in many other specific forms without departing from the spirit or scope of the invention. Particularly, it should be understood that the invention may be embodied in the following forms.

(1) In the first embodiment, vacuum in the intake duct 20 is adjusted by an electronically controlled throttle mechanism including the throttle valve 23 located in the duct 20 and the step motor 22 actuating the valve 23. However, vacuum in the duct 20 may be controlled by other means. For example, vacuum in the duct 20 may be controlled by the EGR mechanism 51, which includes the EGR valve 53. Alternatively, vacuum in the duct 20 may be controlled by an idle speed control (ISC) mechanism that includes a bypass passage that bypasses the throttle valve 23, an idle speed control (ISC) valve and an actuator actuating the ISC valve. Further, vacuum in the duct 20 may be controlled by both of the EGR mechanism 51 and the ISC mechanism.

Figure 10:
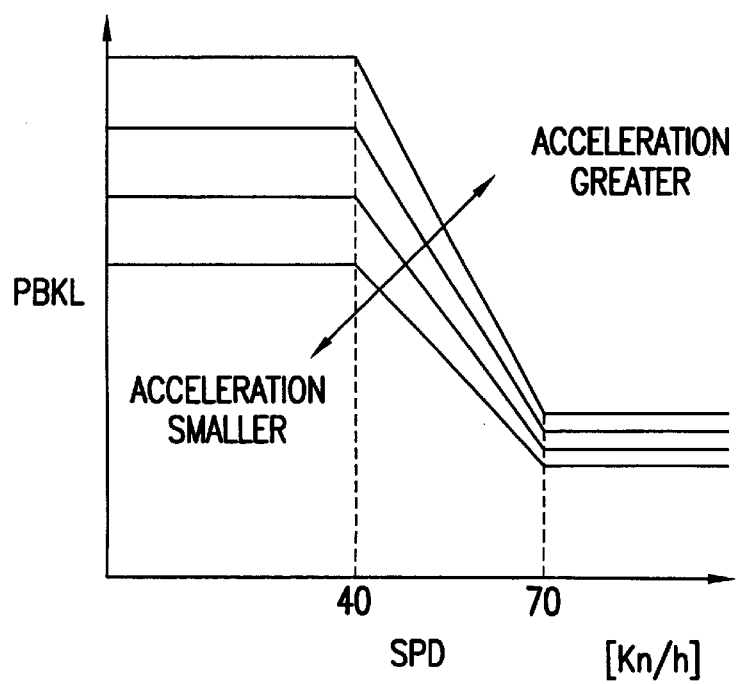
FIG. 10 is a graph showing the relationship between vehicle speed and the pressure at which a vacuum pressure producing process is started according to another embodiment.

(2) In the first embodiment, the vehicle is not judged to be accelerating when the complete closure signal IDL is set at one. In this case, the starting pressure value PBKL is increased. That is, the approximate acceleration state of the vehicle is detected referring to the complete closure signal IDL and the starting pressure value PBKL is changed in accordance with the detected acceleration state. However, more accurate acceleration of the vehicle may be detected and the starting pressure value PBKL may be set at a greater value when the detected acceleration is smaller by referring to function data that is similar to the data of FIG. 10 In this case, the ECU 30 may compute the acceleration of the vehicle based on the vehicle speed SPD detected by the vehicle speed sensor 64. Alternatively, the vehicle may be equipped with an acceleration sensor for detecting the acceleration of the vehicle. Also, FIGS. 7 and 10 only show examples of the relationship between the vehicle speed SPD and the starting pressure value PBKL. The relationship between SPD and PBKL may be altered in accordance with the performance characteristics of the brake booster 71 and with required braking force, which may differ in one vehicle from another.

(3) In the first embodiment, the pressure PBK in the vacuum chamber of the brake booster 71 and the starting pressure PBKL are compared for judging whether vacuum needs to be produced for actuating the brake booster. However, as in the second embodiment, whether vacuum needs to be produced may be judged by comparing the relative pressure value DPBK with a starting relative pressure value KPBKL. Further, in the second embodiment, whether vacuum needs to be produced may be judged by comparing the vacuum chamber pressure PBK with a starting pressure value PBKL.

(4) Similar to the second embodiment, a finishing pressure value PBKO that is lower than the starting pressure value PBKL may be used in the first embodiment. In this case, the target values (the pressure values PBKL and PBKO) have a hysterisis. This stabilizes the control process.

(5) In the first embodiment, the determination speed α, which is used for judging whether the vehicle is moving at a relatively low speed and requires relatively weak braking force, set at 40 km/h. However, the determination speed α may be changed in accordance with the performance characteristics of the brake booster and with required braking force, which may differ in one vehicle from another.

(6) In the first embodiment, the closing compensation amount γ is changed in accordance with the difference between the pressure PBK in the vacuum chamber of the brake booster 71 and the starting pressure PBKL (PBK–PBKL). However, the compensation amount γ may be constant.

(7) In steps 103–105 of the first embodiment, the starting pressure value PBKL is increased when the vehicle speed SPD is equal to or lower than 40 km/h and the acceleration pedal 24 is not depressed at all. However, steps 103–105 may be deleted for simplifying the program.

(8) In the first embodiment, the vehicle speed SPD is detected by the vehicle speed sensor 64 and the acceleration of the vehicle is approximately detected by the complete closure switch 26B. However, the vehicle speed SPD and acceleration may be indirectly detected based on parameters such as the engine speed NE, the intake pressure, the acceleration pedal depression amount ACCP and the selected gear combination of a transmission.

(9) In the first and second embodiments, the present invention is applied to the cylinder injection type engine 1. The present invention may also be applied to an engine that performs stratified charge combustion and semistratified charge combustion. For example, the present invention may be applied to an engine that injects fuel beneath the intake valves 6a, 6b provided in the associated intake ports 7a, 7b.

(10) In the first and second embodiments, helical type intake ports are employed to produce swirls. However, the swirls do not necessarily have to be produced. In such case, parts such as the swirl control valve 17 and the step motor 19 may be eliminated.

(11) The vacuum producing processes of the first and second embodiments are executed when stratified charge combustion is performed. However, the processes may be executed when lean burn combustion, in which intake vacuum is relatively low, is performed.

(12) In steps 103–105 of the first embodiment, the starting pressure value PBKL is increased when the vehicle speed SPD is 40 km/h or lower and the gas pedal 24 is not depressed at all. Similarly, the starting pressure value KPBKL of the second embodiment may be decreased when the vehicle speed SPD is equal to or lower than a predetermined value and the acceleration pedal 24 is not depressed at all.

Therefore, the present examples and embodiments are to be considered as illustrative and not restrictive and the invention is not to be limited to the details given herein, but may be modified within the scope and equivalence of the appended claims.

What is claimed is:

1. An apparatus for controlling pressure in a vehicle engine having an air intake passage for introducing airflow to a combustion chamber and a throttle valve disposed in the intake passage, said throttle valve being arranged to selectively increase and decrease its opening size to adjust the airflow in the intake passage whereby pressure in the intake passage is respectively increased and decreased, and wherein said throttle valve is open when the engine performs a stratified charge combustion, said apparatus comprising:

a brake booster connected to the intake passage to accumulate the pressure that is generated in the intake passage, said brake booster obtaining braking force for the vehicle when the accumulated pressure is smaller than a predetermined reference value;

first detecting means for detecting the pressure accumulated in the brake booster;

actuating means for actuating the throttle valve to decrease the pressure in the intake passage when the detected pressure is larger than the predetermined reference value;

second detecting means for detecting movement characteristics of the vehicle;

correcting means for correcting the reference value based on the detected movement characteristics of the vehicle.

2. The apparatus as set forth in claim 1, wherein said movement characteristics include at least one of speed and acceleration of the vehicle.

3. The apparatus as set forth in claim 2, wherein said correcting means selects the reference value inversely proportional to the movement characteristics.

4. The apparatus as set forth in claim 1, wherein said reference value is based on a difference between the pressure in the brake booster and an atmospheric pressure.

5. The apparatus as set forth in claim 1, wherein the opening size of said throttle valve is selected based on a load applied to the engine when the engine performs a homogeneous charge combustion, and wherein said actuating means includes means for altering a combustion mode of the engine from the stratified charge combustion to the homogeneous charge combustion.

6. The apparatus as set forth in claim 5, further comprising an electric control unit that forms said actuating means, said altering means and said correcting means.

7. The apparatus as set forth in claim 6, further comprising a step motor having a motor shaft that integrally supports the throttle valve, wherein said motor is driven by the electric control unit.

8. An apparatus for controlling pressure in a vehicle engine having an air intake passage for introducing airflow to a combustion chamber and a throttle valve disposed in the intake passage, said throttle valve being arranged to selectively increase and decrease its opening size to adjust the airflow in the intake passage whereby pressure in the intake passage is respectively increased and decreased, wherein said throttle valve is open when the engine performs a stratified charge combustion mode, and wherein an opening size of said throttle valve is selected based on a load applied to the engine when the engine performs a homogeneous charge combustion mode, said apparatus comprising:

a brake booster connected to the intake passage to accumulate the pressure that is generated in the intake passage, said brake booster obtaining braking force for the vehicle when the accumulated pressure is smaller than a predetermined reference value;

altering means for altering the combustion mode of the engine;

first detecting means for detecting the pressure accumulated in the brake booster;

actuating means for actuating the altering means so as to alter the combustion mode from the stratified charge combustion to the homogeneous charge combustion to decrease the pressure in the intake passage when the detected pressure is larger than the predetermined reference value;

second detecting means for detecting movement characteristics of the vehicle;

correcting means for correcting the reference value based on the detected movement characteristics of the vehicle.

9. The apparatus as set forth in claim 8, wherein said movement characteristics include at least one of speed and acceleration of the vehicle.

10. The apparatus as set forth in claim 9, wherein said correcting means selects the reference value inversely proportional to the movement characteristics.

11. The apparatus as set forth in claim 8, wherein said reference value is based on a difference between the pressure in the brake booster and an atmospheric pressure.

12. The apparatus as set forth in claim 8, further comprising an electric control unit that forms said actuating means, said altering means and said correcting means.

13. The apparatus as set forth in claim 12, further comprising a step motor having a motor shaft that integrally supports the throttle valve, wherein said motor is driven by the electric control unit.

* * * * *